United States Patent [19]

Hamazu et al.

[11] Patent Number: 5,359,017
[45] Date of Patent: Oct. 25, 1994

[54] CATIONICALLY POLYMERIZABLE ORGANIC MATERIAL COMPOSITIONS AND METHOD FOR THE STABILIZATION THEREOF

[75] Inventors: Fumio Hamazu; Tatsuya Koizumi, both of Yamaguchi; Minoru Yokoshima, Toride; Masaki Fujimoto, Yono; Takeshi Endoh, Yokohama, all of Japan

[73] Assignees: Nippon Kayaku Kabushiki Kaisha, Tokyo; Sanshin Chemical Industry Co., Ltd., Yanai, both of Japan

[21] Appl. No.: 108,435

[22] Filed: Aug. 18, 1993

Related U.S. Application Data

[62] Division of Ser. No. 910,015, Aug. 3, 1992, abandoned.

[30] Foreign Application Priority Data

Nov. 16, 1990 [JP] Japan .................. 2-312152
Oct. 21, 1991 [JP] Japan .................. 3-301041

[51] Int. Cl.$^5$ .................. C08F 4/20; C08F 4/80; C08G 59/18
[52] U.S. Cl. .................. 526/211; 526/171; 526/204; 526/222; 526/193; 526/346; 528/89; 528/90; 528/92; 528/93
[58] Field of Search .................. 522/25, 29; 526/171, 526/204, 211, 222, 193; 528/89, 90, 92, 93

[56] References Cited

U.S. PATENT DOCUMENTS

| | | | |
|---|---|---|---|
| 3,412,046 | 11/1968 | Payne et al. | 260/2 |
| 3,691,133 | 9/1972 | Sura | 260/47 EC |
| 4,058,401 | 11/1977 | Crivello | 96/115 R |
| 4,173,551 | 11/1979 | Crivello | 523/457 |
| 4,216,288 | 8/1980 | Crivello | 430/280 |
| 4,230,814 | 10/1980 | Crivello | 526/333 |
| 4,241,204 | 12/1980 | Crivello | 526/333 |
| 4,245,029 | 1/1981 | Crivello | 430/280 |
| 4,336,363 | 6/1982 | Crivello | 526/333 |
| 4,383,025 | 5/1983 | Green et al. | 430/280 |
| 4,950,696 | 8/1990 | Palazotto et al. | 522/25 |
| 4,957,946 | 9/1990 | Meier et al. | 522/59 |
| 5,013,814 | 5/1991 | Roth et al. | 528/90 |
| 5,296,567 | 3/1994 | Baumann et al. | 526/172 |

FOREIGN PATENT DOCUMENTS

| | | |
|---|---|---|
| 0193246 | 8/1988 | European Pat. Off. . |
| 0321407 | 6/1989 | European Pat. Off. . |
| 0331496 | 9/1989 | European Pat. Off. . |
| 1118564 | 5/1989 | Japan . |

OTHER PUBLICATIONS

Vol. 13 No. 15 (C-559) (3363) Jan. 13, 1989 Patent Abstracts of Japan JP 63-223002.
Concise Chemical and Technical Dictionary 1974, H. Bennett, F.A.I.C., p. 524.
Grant & Hackh's Chemical Dictionary p. 273.

*Primary Examiner*—Mark Nagumo
*Attorney, Agent, or Firm*—Nields & Lemack

[57] ABSTRACT

The present invention provides a cationically polymerizable organic material composition comprising a composition which contains a cationic polymerization catalyst(s) and a cationically polymerizable organic material(s) as essencial ingredients, and one or more onium salts having a nucleophilic pair anion represented by halogenide, alkyl sulfate or p-toluenesulfonate ions, or one or more iron aromatic compound salts represented by the following formula (I):

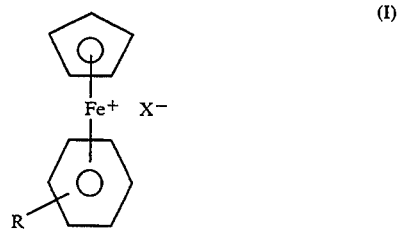

(I)

The composition of the present invention is a cationically polymerizable organic material composition capable of being cured by irradiation of a radiation or by heat, and it also has excellent storage stability at room temperature in the dark and a long pot life.

14 Claims, No Drawings

CATIONICALLY POLYMERIZABLE ORGANIC MATERIAL COMPOSITIONS AND METHOD FOR THE STABILIZATION THEREOF

This application is a divisional of application Ser. No. 07/910,015 filed Aug. 3, 1992 now abandoned.

FIELD OF THE INVENTION

The present invention relates to a cationically polymerizable organic material composition which comprises a cationic polymerization catalyst(s) and a cationically polymerizable organic material(s) as essential ingredients and which are capable of being cured by irradiation of a radiation (e.g. UV and electron beam) or by heat, and to a method for the stabilization of said composition. More particularly, it relates to a cationically polymerizable organic material composition having a prolonged pot life, and to a method for stabilizing the composition with an one-pack composition thereof.

PRIOR ART

Dicyandiamide has been hitherto used extensively as a cationic polymerization catalyst for cationically polymerizable organic materials, inter alia one-pack epoxy resins, but the compound requires a considerably elevated temperature and a long time for the curing of the materials while having excellent stability at room temperature. To solve the disadvantages, p-methoxybenzyltetramethylenesulfonium salt (Japanese Patent Application Laying Open (KOKAI) Nos. 58-37003 and 63-223002) and p-methoxybenzyl-2-cyanopyridinium salt (the 39th lecture and discussion meeting for thermosetting resins-abstract (1989) pp. 67–70, Japan) has been proposed as catalysts capable of curing said materials by a little heat and within a short time.

PROBLEMS TO BE SOLVED BY THE INVENTION

The above described p-methoxybenzyltetramethylenesulfonium or p-methoxybenzyl-2-cyanopyridinium salts has high activity, but they also have drawbacks such as poor stability and short pot life, and accordingly the one-pack epoxy resins must be stored at low temperature resulting in the much lower practical use of said salts.

DETAILED DESCRIPTION OF THE INVENTION

Through our studies to solve said problems, we have found cationically polymerizable organic material compositions which have excellent storage stability at room temperature or at room temperature in the dark and which are capable of being polymerized or cured by radiation and/or heat for a short time, by incorporating a specific compound acting as stabilizer into a composition which contains a cationic polymerization catalyst(s) and a cationically polymerizable organic material(s) as essential ingredients. The present invention is based on this discovery.

Accordingly, the present invention relates to a cationically polymerizable organic material composition characterized by incorporating, as stabilizer, one or more onium salts having a nucleophilic pair anion chosen from halogen, perchlorate, alkyl sulfate and p-toluenesulfonate ions, or one or more iron aromatic compounds represented by the general formula (I):

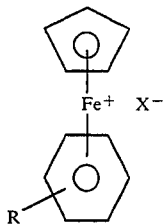

where R is hydrogen, halogen or a $C_1$–$C_4$ alkyl group; and X is halogen, perchlorate, alkyl sulfate or p-toluenesulfonate, into a cationically polymerizable organic material composition which contains a cationic polymerization catalyst(s) and a cationically polymerizable organic material(s) as essential ingredients.

Among the stabilizers of the present invention, they include any onium salt having the above mentioned nucleophilic pair anions, but preferred onium salts are any compound consisting of an onium ion having a phenyl or substituted phenyl, alkyl, benzyl or substituted benzyl, or α-naphthylmethyl group on the onium atom, and a given pair anion, where examples of the substituted phenyl group are p-hydroxyphenyl, p-acetoxyphenyl, 3,5-di-tert-butyl-4-hydroxyphenyl, and p-benzyloxycarbonyloxyphenyl groups; and examples of the substituted benzyl group are p-chlorobenzyl, p-methylbenzyl, p-nitrobenzyl, o-nitrobenzyl, m-nitrobenzyl, p-methoxybenzyl, o-methylbenzyl, o-chlorobenzyl, m-chlorobenzyl, and m-methylbenzyl groups.

The onium salts usable as stabilizer are for example sulfonium salts such as compounds represented by the following general formula (II):

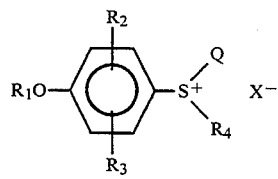

where $R_1$ is hydrogen, methyl, acetyl, methoxycarbonyl, ethoxycarbonyl, or benzyloxycarbonyl group; $R_2$ and $R_3$ are independently hydrogen, halogen, or a $C_1$–$C_4$ alkyl group; $R_4$ is a $C_1$–$C_4$ alkyl group; Q represents a $C_1$–$C_4$ alkyl, benzyl, methylbenzyl, dimethylbenzyl, trimethylbenzyl, chlorobenzyl, dichlorobenzyl, trichlorobenzyl, nitrobenzyl, dinitrobenzyl, trinitrobenzyl, or naphthylmethyl group; and X is halogen, perchlorate, alkyl sulfate, or p-toluenesulfonate, and ammonium salts and phosphonium salts.

Exemplified stabilizers for use in the compositions of the present invention are preferably benzyl-p-hydroxyphenylmethylsulfonium chloride, benzyl-p-hydroxyphenylethylsulfonium chloride, benzyl-p-hydroxyphenylmethyl methyl sulfate, p-chlorobenzyl-4-hydroxyphenylmethylsulfonium chloride, p-nitrobenzyl-4-hydroxyphenylmethylsulfonium chloride, o-methylbenzyl-4-hydroxyphenylmethylsulfonium chloride, m-methylbenzyl-4-hydroxyphenylmethylsulfonium chloride, benzyl-4-methoxyphenylmethylsulfonium chloride, benzyl-3-methyl-4-hydroxyphenylmethylsulfonium chloride, benzyl-3-methyl-4-hydroxy-5-tert-butylphenylmethylsulfonium chloride, dibenzyl-4-hydroxyphenylsulfonium chloride, α-naphthylmethyl- 4-hydroxyphenylmethylsulfonium chloride, 4-hydroxyphenyldimethyl methyl sulfate, 4-(benzyloxycarbonyloxy)phenyldimethyl methyl sulfate, triphenylsulfonium chloride, bis[4-(diphenylsulfonio)phenyl]sulfide bischloride, benzyldimethylanilinium chloride, triphenylbenzylphosphonium chloride, 4-nitrobenzyldimethyl-p-(methylthio)phenylammonium chloride, and cyclopentadienecumene-iron complex chloride.

The proportion of a stabilizer incorporated into the composition of this invention is preferably from 0.01 to 20 parts by weight and more preferably from 0.1 to 10 parts by weight based on 100 parts by weight of said cationic polymerization catalyst. If an applied amount of the stabilizer is larger, then no cured products to be satisfied can be obtained because a pair anion of the onium or iron aromatic salts attacks a growing terminal of the polymerization reaction during the curing of the composition and leads to a fast termination reaction resulting in insufficient formation of the network structure. On the other hand, if the amount thereof is smaller then its effect as stabilizer can not be achieved, whereby a composition with a sufficient pot life can not be obtained.

Examples of the cationic polymerization catalyst for use in the compositions of the present invention are known sulfonium and ammonium salts such as p-methoxybenzyltetramethylenesulfonium hexafluoroantimonate, p-methoxybenzyltetramethylenesulfonium hexafluorophosphate, benzyl-4-hydroxyphenylmethylsulfonium hexafluoroantimonate, p-nitrobenzyl-4-hydroxyphenylmethylsulfonium hexafluoroantimonate, p-nitrobenzyl-4-hydroxyphenylmethylsulfonium hexafluorophosphate, o-nitrobenzyl-4-hydroxyphenylmethylsulfonium hexafluoroantimonate, o-nitrobenzyl-4-hydroxyphenylmethylsulfonium hexafluorophosphate, α-naphthylmethyl-4-hydroxyphenylmethylsulfonium hexafluorophosphate, p-methoxybenzyl-o-cyanopyridinium hexafluoroantimonate, m-nitrobenzyl-4-hydroxyphenylmethylsulfonium hexafluoroantimonate, ($\eta^6$-cumene)-($\eta^5$-cyclopentadienyl)-iron (II) hexafluorophosphate (commercial name, Irgacure 261; ex Ciba-Geigy A. G.) and p-methoxybenzyldimethylphenylammonium hexafluoroantimonate.

The proportion of a cationic polymerization catalyst incorporated into the composition of this invention is preferably from 0.01 to 20 parts by weight and more preferably from 0.1 to 10 parts by weight, based on 100 parts by weight of said cationically polymerizable organic material.

The cationically polymerizable organic materials usable in this invention are for example cationically polymerizable vinyl compounds such as, styrene and vinyl ethers; and cyclic ethers such as spiro-orthoesters, bicycloorthoesters and spiro-orthocarbonates and epoxy resins. Examples of the epoxy resins include hitherto known aromatic epoxy resins, alicyclic epoxy resins and aliphatic epoxy resins, as well as epoxide monomers and episulfide monomers.

Exemplified aromatic epoxy resins are polyglycidyl ethers of polyhydric phenols having at least one aromatic nucleus or of alkylene oxide adducts of the polyhydric phenol, for example glycidyl ethers prepared by reaction of a bisphenol compound such as bisphenol A, bisphenol F or bisphenol S, or of an alkylene oxide (e.g. ethylene oxide, propylene oxide and butylene oxide) adduct of the bisphenol compound with epichlorohydrin; novolak-type epoxy resins (e.g. phenol.novolak-type epoxy resins, cresol.novolak-type epoxy resins and brominated phenol.novolak-type epoxy resins); and trisphenolmethanetriglycidyl ether. The alicyclic epoxy resins are for example 3,4-epoxycyclohexylmethyl-3,4-epoxycyclohexanecarboxylate, bis-(3,4-epoxycyclohexyl-methyl)adipate, 2-(3,4-epoxycyclohexyl-5,5-spiro-3,4-epoxy)cyclohexanone-metha-dioxane, bis(2,3-epoxycyclopentyl)-ether, and EHPE-3150 (alicyclic epoxy resin, softening point 71° C.; ex DAICEL CHEMICAL INDUSTRIES, LTD.).

Examples of the aliphatic epoxy resins are polyglycidyl ethers of aliphatic polyhydric alcohols or of alkylene oxide adducts of the alcohols, and representatively diglycidyl ether of 1,4-butanediol; diglycidyl ether of 1,6-hexanediol; triglycidyl ether of glycerine; triglycidyl ether of trimethylol propane; diglycidyl ether of polyethylene glycol; diglycidyl ether of propylene glycol; and polyglycidyl ethers of polyether polyols obtained by addition reaction of an aliphatic polyhydric alcohol such as ethylene glycol, propylene glycol or glycerine, with one or more alkylene oxides (e.g. ethylene oxide and propylene oxide). The epoxide monomers are for example monoglycidyl ethers of aliphatic higher alcohols; and monoglycidyl ethers of phenol, cresol or butylphenol, or of polyether alcohols obtained by addition reaction of the phenol compound with an alkylene oxide.

Exemplified cationically polymerizable vinyl compounds are triethyleneglycol divinyl ether, tetraethyleneglycol divinyl ether, cyclohexane-1,4-dimethylol divinyl ether, 1,4-butanediol divinyl ether,

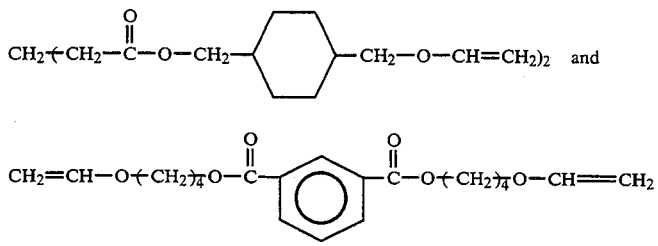

These cationically polymerizable organic materials may be used alone or as mixtures thereof. According to the present invention, the cationically polymerizable organic material compositions which comprises a cationic polymerization catalyst capable of curing said materials by irradiation of a radiation and/or by heat, can keep a long pot life at room temperature or at room temperature in the dark.

The cationic polymerization catalyst being an ingredient of the invention is active on radiation and/or heat. It is thus assumed that the cationic catalyst excited by radiation or heat releases cation species such as benzyl cation, naphthylmethyl cation and proton, whereby the polymerization of the above described cationically polymerizable organic materials is accelerated. However, the cation species generate to some extent even at room temperature, and thereby a problem of the room temperature stabilization will be caused. According to the method for the stabilization of this invention, it is assumed that pair anions of the stabilizer can predominantly trap very small amounts of the initiating species generated at room temperature to result in hindrance of the polymerization of a cationically polymerizable organic material(s).

Upon use the compositions according to this invention may optionally be mixed together with one or more auxiliaries such as bulk fillers, flame retardants, antistatic agents, surfactants, and acid anhydrides.

The compositions of the invention can be used in polishing varnishes, inks, paints, adhesives, laminates, prepregs, molding compounds, sealing compounds, etc.

The compositions of this invention are capable of storing over a long term and thus have a long pot life, and further they have the function of initiating a polymerization quickly by irradiation of for instance light or electron beam and/or by a little heat, excellent curing property, and less moisture absorption, thereby providing cured products having excellent water resistance, chemical resistance and electrical insulation.

EXAMPLES

The present invention will further be illustrated by the following examples in detail, but the scope of the invention is not limited solely by those examples.

Examples 1-5

Each composition was prepared using indicated amounts of a cationic polymerization catalyst and of p-hydroxyphenyldimethylsulfonium methyl sulfate as stabilizer, based on 100 parts by weight of phenyl glycidyl ether as epoxide monomer, and subsequently stored at 40° C. for 30 days. The conversion of the monomer after storage was calculated from a $^1$H-NMR spectrum of the composition. In addition, each of the compositions immediately after preparation or after storage at 40° C. for 30 days was polymerized at 120° C. for 1 hr, and the conversion of the monomer was thereafter calculated from a $^1$H-NMR spectrum of the resulting product. The results are shown in Table 1.

TABLE 1

|  | Examples | | | | |
|---|---|---|---|---|---|
|  | 1 | 2 | 3 | 4 | 5 |
| Phenyl glycidyl ether | 100 | 100 | 100 | 100 | 100 |
| Cationic polymerization catalyst | | | | | |
| HO—C$_6$H$_4$—S$^+$(CH$_3$)(CH$_2$—C$_6$H$_5$) SbF$_6^-$ | 3 | 3 | 3 | | |
| CH$_3$O—C$_6$H$_4$—CH$_2$—S$^+$(tetrahydrothiophenium) SbF$_6^-$ | | | | 3 | |
| CH$_3$O—C$_6$H$_4$—CH$_2$—$^+$N(CN-pyridinium) SbF$_6^-$ | | | | | 3 |
| Stabilizer | | | | | |
| HO—C$_6$H$_4$—S$^+$(CH$_3$)$_2$ CH$_3$SO$_4^-$ | 0.03 | 0.10 | 0.15 | 0.03 | 0.03 |
| Conversion after storage at 40° C. for 30 days (%) | 0 | 0 | 0 | 0 | 2 |
| Conversion after polymerization at 120° C. for 1 hr (%) — Immediately after preparation | 82 | 82 | 80 | 84 | 84 |
| Conversion after polymerization at 120° C. for 1 hr (%) — After storage at 40° C. for 30 days | 80 | 80 | 77 | 83 | 83 |

Examples 6–13

Stabilization of each composition which has been prepared using 100 parts by weight of phenyl glycidyl ether and 3 parts by weight of p-hydroxyphenylbenzylmethylsulfonium hexafluoroantimonate as cationic polymerization catalyst together with various types of stabilizers, was estimated in accordance with the procedure described in Examples 1-5. The results are shown in Table 2.

TABLE 2

| | Examples | | | | | | | |
|---|---|---|---|---|---|---|---|---|
| | 6 | 7 | 8 | 9 | 10 | 11 | 12 | 13 |
| Phenyl glycidyl ether | 100 | 100 | 100 | 100 | 100 | 100 | 100 | 100 |
| Catalyst | 3 | 3 | 3 | 3 | 3 | 3 | 3 | 3 |

Catalyst: HO–C6H4–S+(CH3)(CH2C6H5) SbF6−

Stabilizer

| Stabilizer structure | 6 | 7 | 8 | 9 | 10 | 11 | 12 | 13 |
|---|---|---|---|---|---|---|---|---|
| HO–C6H4–S+(CH3)(CH2–C6H4–Cl) Cl− | 0.03 | | | | | | | |
| HO–C6H4–S+(CH3)(CH2–C6H4–NO2) Cl− | | 0.03 | | | | | | |
| HO–C6H4–S+(CH3)(CH2–C6H5) Cl− | | | 0.03 | | | | | |
| CH3O–C6H4–S+(CH3)(CH2–C6H5) Cl− | | | | 0.03 | | | | |
| HO–C6H3(CH3)–S+(CH3)(CH2–C6H5) Cl− | | | | | 0.03 | | | |
| HO–C6H4–S+(CH3)(CH2–C6H4-m-NO2) Cl− | | | | | | 0.03 | | |
| HO–C6H4–S+(CH3)(CH2–C6H4–NO2) Br− | | | | | | | 0.03 | |
| C6H5–CH2–O–C(=O)–O–C6H4–S+(CH3)2 CH3SO4− | | | | | | | | 0.03 |
| Conversion after storage at 40° C. for 30 days (%) | 0 | 0 | 3 | 0 | 0 | 0 | 1 | 1 |
| Conversion after polymerization at 120° C. for 1 hr (%) — Immediately after preparation | 80 | 82 | 82 | 80 | 83 | 80 | 82 | 81 |
| Conversion after polymerization at 120° C. for 1 hr (%) — After storage at | 80 | 83 | 80 | 78 | 81 | 80 | 82 | 82 |

TABLE 2-continued

| | Examples | | | | | | | |
|---|---|---|---|---|---|---|---|---|
| | 6 | 7 | 8 | 9 | 10 | 11 | 12 | 13 |
| 40° C. for 30 days | | | | | | | | |

Examples 14–19

Stabilization of each composition which has been prepared using 100 parts by weight of phenyl glycidyl ether and 3 parts by weight of p-methoxybenzyltetramethylenesulfonium hexafluoroantimonate as cationic polymerization catalyst together with various types of stabilizers, was estimated in accordance with the procedure described in Examples 1–5. The results are shown in Table 3.

TABLE 3

| | | Examples | | | | | |
|---|---|---|---|---|---|---|---|
| | | 14 | 15 | 16 | 17 | 18 | 19 |
| Phenyl glycidyl ether | | 100 | 100 | 100 | 100 | 100 | 100 |
| Catalyst | | 3 | 3 | 3 | 3 | 3 | 3 |
| $CH_3O-\langle\bigcirc\rangle-CH_2-S^+\langle\rangle\ SbF_6^-$ | | | | | | | |
| Stabilizer | | | | | | | |
| $(\langle\bigcirc\rangle)_3-S^+\ Cl^-$ | | 0.03 | | | | | |
| $(\langle\bigcirc\rangle_2 S^+-\langle\bigcirc\rangle-S)_2\ 2Cl^-$ | | | 0.03 | | | | |
| $(\langle\bigcirc\rangle)_3-P^+-CH_2-\langle\bigcirc\rangle\ Cl^-$ | | | | 0.03 | | | |
| $NO_2-\langle\bigcirc\rangle-CH_2-N^+(CH_3)_2-\langle\bigcirc\rangle-SCH_3\ Cl^-$ | | | | | 0.03 | | |
| $\langle\bigcirc\rangle-CH_2-N^+(CH_3)_2-\langle\bigcirc\rangle\ Cl^-$ | | | | | | 0.03 | |
| Ferrocenium complex $Cl^-$ | | | | | | | 0.03 |
| Conversion after storage at 40° C. for 30 days (%) | | 0 | 0 | 3 | 3 | 4 | 0 |
| Conversion after polymerization at 120° C. for 1 hr (%) | Immediately after preparation | 83 | 82 | 82 | 84 | 84 | 85 |
| | After storage at | 80 | 82 | 81 | 82 | 82 | 85 |

TABLE 3-continued

| | Examples | | | | | |
|---|---|---|---|---|---|---|
| | 14 | 15 | 16 | 17 | 18 | 19 |
| 40° C. for 30 days | | | | | | |

Examples 20-25

Stabilization of each composition which has been prepared using 100 parts by weight of phenyl glycidyl ether and 3 parts by weight of p-methoxybenzyl 2-cyanopyridinium hexafluoroantimonate as cationic polymerization catalyst together with various types of stabilizers, was estimated in accordance with the procedure described in Examples 1-5. The results are shown in Table 4

TABLE 4

| | | Examples | | | | | |
|---|---|---|---|---|---|---|---|
| | | 20 | 21 | 22 | 23 | 24 | 25 |
| Phenyl glycidyl ether | | 100 | 100 | 100 | 100 | 100 | 100 |
| Catalyst [CH₃O-C₆H₄-CH₂-N⁺(C₅H₃N-CN) SbF₆⁻] | | 3 | 3 | 3 | 3 | 3 | 3 |
| Stabilizer | | | | | | | |
| (C₆H₅)₃S⁺ Cl⁻ | | 0.03 | | | | | |
| [(C₆H₅)₂S⁺-C₆H₄-S]₂ 2Cl⁻ | | | 0.03 | | | | |
| (C₆H₅)₃P⁺-CH₂-C₆H₄-Cl⁻ | | | | 0.03 | | | |
| NO₂-C₆H₄-CH₂-N⁺(CH₃)₂-C₆H₄-SCH₃ Cl⁻ | | | | | 0.03 | | |
| C₆H₅-CH₂-N⁺(CH₃)₂-C₆H₄-Cl⁻ | | | | | | 0.03 | |
| [Cp-Fe⁺-(C₆H₅-iPr)] Cl⁻ | | | | | | | 0.03 |
| Conversion after storage at 40° C. for 30 days (%) | | 0 | 0 | 2 | 2 | 3 | 0 |
| Conversion after polymerization at 120° C. for 1 hr (%) | Immediately after preparation | 84 | 82 | 83 | 82 | 84 | 82 |
| | After storage at | 82 | 80 | 80 | 82 | 83 | 81 |

TABLE 4-continued

| | Examples | | | | | |
|---|---|---|---|---|---|---|
| | 20 | 21 | 22 | 23 | 24 | 25 |
| 40° C. for 30 days | | | | | | |

Comparative Examples 1-3

Stabilizer-free equivalent compositions were prepared and subjected to the similar tests in accordance with the procedure described in Examples 1-5. The results are shown in Table 5. In these cases, the compositions after storage at 40° C. for 30 days were not subjected to 1-hr polymerization at 120° C.

TABLE 5

| | Comparative examples | | |
|---|---|---|---|
| | 1 | 2 | 3 |
| Phenyl glycidyl ether | 100 | 100 | 100 |
| Cationic polymerization catalyst | | | |
| HO–C$_6$H$_4$–S$^+$(CH$_3$)(CH$_2$–C$_6$H$_5$) SbF$_6^-$ | 3 | | |
| CH$_3$O–C$_6$H$_4$–CH$_2$–S$^+$(tetrahydrothiophene) SbF$_6^-$ | | 3 | |
| CH$_3$O–C$_6$H$_4$–CH$_2$–$^+$N(3-CN-pyridine) SbF$_6^-$ | | | 3 |

TABLE 5-continued

| | | Comparative examples | | |
|---|---|---|---|---|
| | | 1 | 2 | 3 |
| Conversion after storage at 40° C. for 30 days (%) | | 62 | 80 | 77 |
| Conversion after polymerization at 120° C. for 1 hr (%) | Immediately after preparation | 82 | 84 | 82 |
| | After storage at 40° C. for 30 days | — | — | — |

Examples 26–32, Comparative Examples 4–6

Compositions which have been prepared from 97.5 parts by weight of Epikote 828 (bisphenol A type epoxy resin; ex Yuka-Shell Epoxy), 2.5 parts by weight of n-butylglycidyl ether, and indicated amounts of a cationic polymerization catalyst(s) and of a stabilizer, were stored at 40° C. for 30 days and then determined for viscosity (at 25° C.) and curing time. The curing time means a time taken until a rotator stops rotating when a small amount of the composition was stirred using the rotator in a vial. Herein the curing times of the compositions of Comparative examples 4-6 after storage at 40° C. for 30 days were not determined. The results are shown in Table 6.

TABLE 6

| | Examples | | | | | | | Comparative examples | | |
|---|---|---|---|---|---|---|---|---|---|---|
| | 26 | 27 | 28 | 29 | 30 | 31 | 32 | 4 | 5 | 6 |
| Epikote 828 | 95 | 95 | 95 | 95 | 95 | 95 | 95 | 95 | 95 | 95 |
| n-Butylglycidyl ether | 2.5 | 2.5 | 2.5 | 2.5 | 2.5 | 2.5 | 2.5 | 2.5 | 2.5 | 2.5 |
| Cationic polymerization catalyst | | | | | | | | | | |
| HO–C$_6$H$_4$–S$^+$(CH$_3$)(CH$_2$–C$_6$H$_5$) SbF$_6^-$ | 0.5 | 0.5 | 0.5 | 0.5 | 0.5 | 0.5 | 0.5 | | | |
| HO–C$_6$H$_4$–S$^+$(CH$_3$)(CH$_2$–C$_6$H$_4$–Cl) SbF$_6^-$ | | 0.5 | | | | | | | 0.5 | |
| CH$_3$O–C$_6$H$_4$–CH$_2$–S$^+$(tetrahydrothiophene) SbF$_6^-$ | | | 0.5 | | | | | | | 0.5 |
| Stabilizer | | | | | | | | | | |

TABLE 6-continued

|  | Examples | | | | | | | Comparative examples | | |
|---|---|---|---|---|---|---|---|---|---|---|
|  | 26 | 27 | 28 | 29 | 30 | 31 | 32 | 4 | 5 | 6 |
| HO—⟨C₆H₄⟩—S⁺(CH₃)(CH₂—C₆H₅) Cl⁻ | 0.025 | 0.025 | 0.025 |  |  | 0.05 | 0.01 |  |  |  |
| HO—⟨C₆H₄⟩—S⁺(CH₃)₂ CH₃SO₄⁻ |  |  |  | 0.025 |  |  |  |  |  |  |
| HO—⟨C₆H₄⟩—S⁺(CH₃)(CH₂—C₆H₄—Cl) Cl⁻ |  |  |  |  | 0.025 |  |  |  |  |  |
| Viscosity after preparation (cp) | 4500 | 4400 | 4500 | 4500 | 4500 | 4000 | 5000 | 6500 | 6000 | 6200 |
| Viscosity after storage at 40° C. for 30 days (cp) | 5500 | 5000 | 4800 | 4500 | 5100 | 4300 | 9000 | >50000 | >50000 | >50000 |
| Curing time at 150° C. — Immediately after preparation | 3' 30" | 3' 50" | 3' 15" | 3' 30" | 3' 30" | 3' 50" | 3' 15" | 3' 10" | 3' 25" | 2' 40" |
| Curing time at 150° C. — After storage at 40° C. for 30 days | 4' 15" | 4' 45" | 4' 30" | 3' 30" | 4' 30" | 4' 50" | 3' 15" | — | — | — |

Examples 33-38

Compositions which have been prepared from 100 parts by weight of the alicyclic epoxy resin 3,4-epoxycyclohexylmethyl-3,4-epoxycyclohexane carboxylate (ex DAICEL CHEMICAL INDUSTRIES, LTD.) and indicated amounts of a cationic polymerization catalyst and of a stabilizer, were stored for 30 days at room temperature in the dark. Each of the compositions after storage and immediately after preparation was measured for curing time by irradiation of sunlight. The curing time means a time taken until the flow of a composition stops completely when a vial was tipped in which the composition has been previously put at a small level and continually irradiated by sunlight. Then the state of the samples after storage was observed and classified into: ○, less increase of viscosity; Δ, increase of viscosity while the sample has a flowing property; and x, gelation. The results are shown in Table 7.

TABLE 7

|  | Examples | | | | | |
|---|---|---|---|---|---|---|
|  | 33 | 34 | 35 | 36 | 37 | 38 |
| Alicyclic epoxy resin | 100 | 100 | 100 | 100 | 100 | 100 |
| Cationic polymerization catalyst |  |  |  |  |  |  |
| HO—⟨C₆H₄⟩—S⁺(CH₃)(CH₂—C₆H₄—NO₂) SbF₆⁻ | 2 | 2 | 2 |  |  |  |
| HO—⟨C₆H₄⟩—S⁺(CH₃)(CH₂—C₆H₄—NO₂) PF₆⁻ |  |  |  | 2 |  |  |
| HO—⟨C₆H₄⟩—S⁺(CH₃)(CH₂—C₆H₄—NO₂) SbF₆⁻ |  |  |  |  | 2 |  |

TABLE 7-continued

| | Examples | | | | | |
|---|---|---|---|---|---|---|
| | 33 | 34 | 35 | 36 | 37 | 38 |

HO—⟨⟩—S⁺(CH₃)(CH₂—⟨⟩) PF₆⁻     | | | | | | 2 |

Stabilizer

HO—⟨⟩—S⁺(CH₃)(CH₂—⟨⟩) Cl⁻   | 0.10 | 0.15 | 0.05 | 0.10 | 0.10 | 0.20 |

| State after storage for 30 days at room temp. in the dark | | ○ | ○ | △ | ○ | ○ | △ |
|---|---|---|---|---|---|---|---|
| Curing time by irradiation of sunlight (min) | Immediately after preparation | 20 | 30 | 15 | 60 | 20 | 15 |
| | After storage for 30 days at room temp. | 30 | 40 | 25 | 90 | 30 | 30 |

Examples 39–41

Stabilization of each composition which has been prepared using 100 parts by weight of an alicyclic epoxy resin and 2 parts by weight of p-nitrobenzyl-4-hydroxyphenylmethylsulfonium hexafluoroantimonate as cationic polymerization catalyst together with various types of stabilizers, was estimated in accordance with the procedure described in Examples 33–38. The results are shown in Table 8.

TABLE 8

| | Examples | | |
|---|---|---|---|
| | 39 | 40 | 41 |
| Alicyclic epoxy resin | 100 | 100 | 100 |
| Catalyst | | | |
| HO—⟨⟩—S⁺(CH₃)(CH₂—⟨⟩—NO₂) SbF₆⁻ | 2 | 2 | 2 |
| Stabilizer | | | |
| HO—⟨⟩—S⁺(CH₃)(CH₂—⟨⟩—NO₂) Cl⁻ | 0.10 | | |

TABLE 8-continued

| | Examples | | |
|---|---|---|---|
| | 39 | 40 | 41 |
| HO—⟨⟩—S⁺(CH₃)₂ CH₃SO₄⁻ | | 0.10 | |
| CH₃O—⟨⟩—S⁺(CH₃)(CH₂—⟨⟩) Cl⁻ | | | 0.10 |
| State after storage for 30 days at room temp. in the dark | ○ | ○ | ○ |
| Curing time by irradiation of sunlight (min) Immediately after preparation | 20 | 15 | 20 |
| After storage for 30 days at room temp. | 35 | 15 | 40 |

Examples 42–46

Stabilization of each composition which has been prepared using 100 parts by weight of an alicyclic epoxy resin and 2 parts by weight of p-nitrobenzyl-4-hydroxyphenylmethylsulfonium hexafluoroantimonate as cationic polymerization catalyst together with various types of stabilizers, was estimated in accordance with the procedure described in Examples 33–38. The results are shown in Table 9.

TABLE 9

| | Examples | | | | |
|---|---|---|---|---|---|
| | 42 | 43 | 44 | 45 | 46 |
| Alicyclic epoxy resin | 100 | 100 | 100 | 100 | 100 |
| Catalyst | | | | | |
| | 2 | 2 | 2 | 2 | 2 |

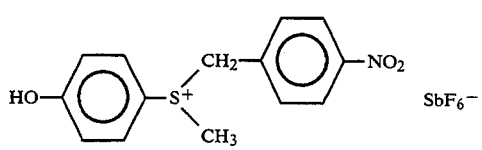

TABLE 9-continued

| Stabilizer | Examples | | | | |
|---|---|---|---|---|---|
| | 42 | 43 | 44 | 45 | 46 |
| (C₆H₅)₃S⁺ Cl⁻ | | | 0.10 | | |
| [(C₆H₅)₂S⁺—C₆H₄—S]₂ 2Cl⁻ | | | | 0.10 | |
| (C₆H₅)₃P⁺—CH₂—C₆H₅ Cl⁻ | | | | | 0.10 |
| NO₂—C₆H₄—CH₂—N⁺(CH₃)₂—C₆H₄—SCH₃ Cl⁻ | 0.10 | | | | |
| (tetrahydrothiophenium)⁺S—CH₂—C₆H₅ Cl⁻ | | 0.10 | | | |
| State after storage for 30 days at room temp. in the dark | ○ | ○ | △ | △ | △ |
| Curing time by irradiation of sunlight (min) — Immediately after preparation | 20 | 25 | 15 | 15 | 15 |
| Curing time by irradiation of sunlight (min) — After storage for 30 days at room temp. | 25 | 30 | 20 | 25 | 25 |

Comparative Examples 7–10

Stabilizer-free equivalent compositions were prepared and subjected to the similar tests in accordance with the procedure described in Examples 33–38. The results are shown in Table 10. In these cases, the samples after storage for 30 days at room temperature in the dark were not tested for curing time.

TABLE 10

| | Comparative examples | | | |
|---|---|---|---|---|
| | 7 | 8 | 9 | 10 |
| Alicyclic epoxy resin | 100 | 100 | 100 | 100 |
| Cationic polymerization catalyst | | | | |

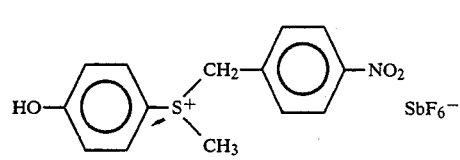

2

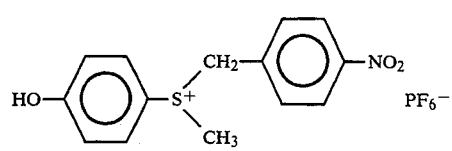

2

TABLE 10-continued

|  | Comparative examples | | | |
|---|---|---|---|---|
|  | 7 | 8 | 9 | 10 |
| 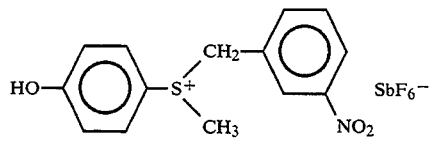 |  |  | 2 |  |
| 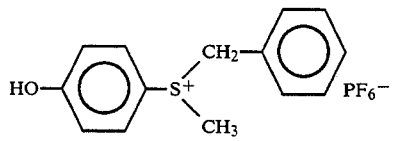 |  |  |  | 2 |
| State after storage for 30 days at room temp. in the dark | X | X | X | X |
| Curing time by irradiation of sunlight (min) — Immediately after preparation | 10 | 50 | 10 | 10 |
| Curing time — After storage for 30 days at room temp. | — | — | — | — |

Examples 47–52, Comparative Examples 11 and 12

Compositions which have been prepared from 100 parts by weight of styrene and indicated amounts of a cationic polymerization catalyst and of a stabilizer, were stored at 40° C. for 30 days. Thereafter the conversion of the styrene was calculated from $^1$H-NMR spectra of the compositions. The results are shown in Table 11.

TABLE 11

|  | Examples | | | | | | Comparative examples | |
|---|---|---|---|---|---|---|---|---|
|  | 47 | 48 | 49 | 50 | 51 | 52 | 11 | 12 |
| Styrene | 100 | 100 | 100 | 100 | 100 | 100 | 100 | 100 |
| Catalyst |  |  |  |  |  |  |  |  |
| 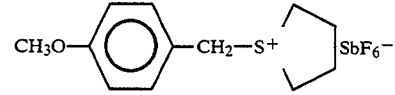 | 3 | 3 | 3 |  |  |  | 3 |  |
| 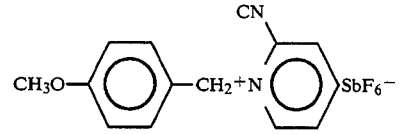 |  |  |  | 3 | 3 | 3 |  | 3 |
| Stabilizer |  |  |  |  |  |  |  |  |
| 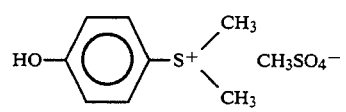 | 0.2 |  |  | 0.2 |  |  |  |  |
| 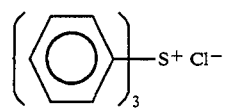 |  | 0.2 |  |  | 0.2 |  |  |  |
| 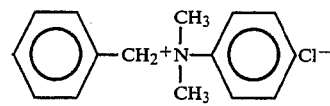 |  |  | 0.2 |  |  | 0.2 |  |  |
| Conversion after storage at 40° C. for 30 days (cp) | 0 | 2 | 4 | 2 | 1 | 3 | 63 | 55 |

Examples 53–56, Comparative Examples 13–15

According to the conditions described in Table 12, compositions were prepared by incorporating 3,4-epoxycyclohexyl-3,4-epoxycyclohexane carboxylate (Celloxide 2021; ex DAICEL CHEMICAL INDUSTRIES, LTD.), a cationic polymerization catalyst and a stabilizer. Then each of the compositions prepared was left at 25° C. in the dark and time-dependently estimated for viscosity and curing property, where the curing property was determined in the following way:

each composition was applied on a hard polyvinyl chloride plate using a spincoater until its thickness finally reaches around 5 μm, and then the plate was passed through UV-ray irradiated from a high pressure mercury lamp (2 kW, 80 w/cm) which has been set at 8 cm-height from the plate, the radiation of UV-ray being continued until the tack of the surface of the coating was disappeared, and the curing property was represented as an irradiated amount (mJ/cm$^2$) required until the disappearance of the tack.

The results are shown in Table 12.

TABLE 12

| | Examples | | | | Comparative examples | | |
|---|---|---|---|---|---|---|---|
| | 53 | 54 | 55 | 56 | 13 | 14 | 15 |
| Celloxide 2021 | 100 | 100 | 100 | 100 | 100 | 100 | 100 |
| Cationic polymerization catalyst | | | | | | | |
| HO–C$_6$H$_4$–S$^+$(CH$_3$)(CH$_2$–C$_6$H$_4$–NO$_2$) SbF$_6^-$ | 1.5 | | | | 1.5 | | |
| HO–C$_6$H$_4$–S$^+$(CH$_3$)(CH$_2$–C$_6$H$_4$–NO$_2$) PF$_6^-$ | | 1.5 | | | | 1.5 | |
| CH$_3$O–C$_6$H$_4$–S$^+$(CH$_3$)(CH$_2$–C$_6$H$_4$–NO$_2$) SbF$_6^-$ | | | 1.5 | | | | |
| (Cp)Fe$^+$(C$_6$H$_5$–CH(CH$_3$)$_2$) PF$_6^-$ | | | | 1.5 | | | 1.5 |
| Stabilizer | 0.1 | 0.1 | 0.1 | 0.1 | | | |
| HO–C$_6$H$_4$–S$^+$(CH$_3$)$_2$ CH$_3$SO$_4^-$ | | | | | | | |
| Viscosity (25° C., cps) | | | | | | | |
| Initial | 220 | 221 | 219 | 223 | 220 | 221 | 223 |
| After 7 days | | | | | Gelation | | |
| After 14 days | | | | | | | 4700 |
| After 30 days | 242 | 347 | 329 | 357 | | 2100 | Gelation |
| Curing property (mJ/cm$^2$) | | | | | | | |
| Initial | 58 | 230 | 58 | 230 | 58 | 230 | 230 |
| After 7 days | | | | | | | |
| After 14 days | 58 | 230 | 58 | 230 | | 230 | 230 |
| After 30 days | 58 | 230 | 58 | 230 | | 230 | |

Examples 57–62

According to the conditions described in Table 13, compositions were prepared by incorporating 3,4-epoxycyclohexyl-3,4-epoxycyclohexane carboxylate (ex DAICEL CHEMICAL INDUSTRIES, LTD., Celloxide 2021), a cationic polymerization catalyst and a stabilizer, and time-dependently estimated for viscosity and curing property in the similar way to that in Examples 53–56. The results are shown in Table 13.

TABLE 13

|  | Examples | | | | | |
|---|---|---|---|---|---|---|
|  | 57 | 58 | 59 | 60 | 61 | 62 |
| Celloxide 2021 | 100 | 100 | 100 | 100 | 100 | 100 |
| Cationic polymerization catalyst | 1.5 | 1.5 | 1.5 | 1.5 | 1.5 | 1.5 |

[Cationic polymerization catalyst structure: HO—C6H4—S+(CH3)(CH2—C6H4—NO2) SbF6−]

| Stabilizer | | | | | | |
|---|---|---|---|---|---|---|
| A-1 | 0.1 | | | | | |
| A-2 | | 0.1 | | | | |
| A-10 | | | 0.1 | | | |
| A-11 | | | | 0.1 | | |
| A-20 | | | | | 0.1 | |
| A-30 | | | | | | 0.1 |
| Viscosity (25° C., cps) | | | | | | |
| Initial | 220 | 220 | 220 | 220 | 220 | 220 |
| After 30 days | 572 | 570 | 1600 | 4400 | 490 | 660 |
| Curing property (mJ/cm$^2$) | | | | | | |
| Initial | 58 | 58 | 58 | 58 | 58 | 58 |
| After 30 days | 58 | 58 | 58 | 58 | 58 | 58 |

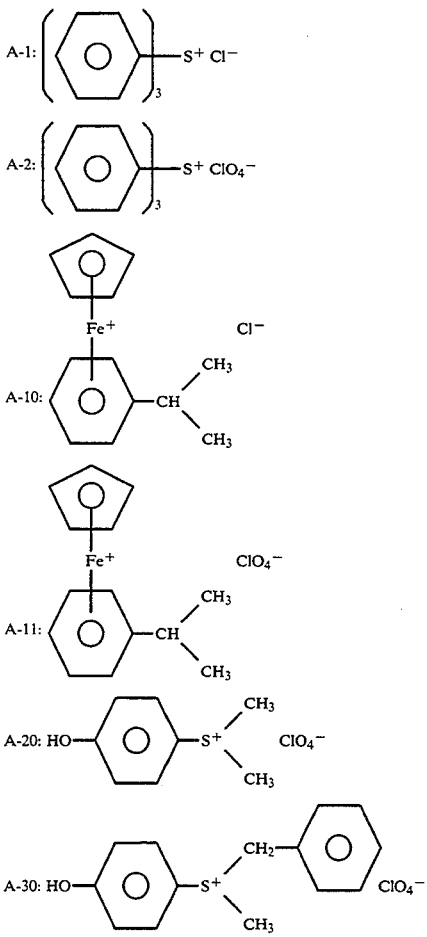

A-1: (C6H5)3S+ Cl−

A-2: (C6H5)3S+ ClO4−

A-10: [cyclopentadienyl-Fe+-(isopropylbenzene)] Cl−

A-11: [cyclopentadienyl-Fe+-(isopropylbenzene)] ClO4−

A-20: HO—C6H4—S+(CH3)2 ClO4−

A-30: HO—C6H4—S+(CH3)(CH2—C6H5) ClO4−

Examples 63–69

According to the conditions described in Table 14, compositions were prepared by incorporating together Celloxide 2021, a cationic polymerization catalyst and a stabilizer, and time-dependently estimated for viscosity and curing property in the similar way to that in Examples 53–56. The results are shown in Table 14.

TABLE 14

|  | Examples | | | | | | |
|---|---|---|---|---|---|---|---|
|  | 63 | 64 | 65 | 66 | 67 | 68 | 69 |
| Celloxide 2021 | 100 | 100 | 100 | 100 | 100 | 100 | 100 |
| Cationic polymerization catalyst | 1.5 | 1.5 | 1.5 | 1.5 | 1.5 | 1.5 | 1.5 |

TABLE 14-continued

[Structure: HO-C6H4-S+(CH3)(CH2-C6H4-NO2) SbF6−]

| | Examples | | | | | | |
|---|---|---|---|---|---|---|---|
| | 63 | 64 | 65 | 66 | 67 | 68 | 69 |
| Stabilizer | | | | | | | |
| A-40 | 0.1 | | | | | | |
| A-41 | | 0.1 | | | | | |
| A-42 | | | 0.1 | | | | |
| A-43 | | | | 0.1 | | | |
| A-44 | | | | | 0.1 | | |
| A-45 | | | | | | 0.1 | |
| A-46 | | | | | | | 0.1 |
| Viscosity (25° C., cps) | | | | | | | |
| Initial | 222 | 221 | 219 | 224 | 221 | 223 | 220 |
| After 30 days | 353 | 345 | 293 | 367 | 340 | 330 | 249 |
| Curing property (mJ/cm²) | | | | | | | |
| Initial | 58 | 58 | 77 | 77 | 116 | 77 | 116 |
| After 30 days | 58 | 58 | 77 | 77 | 116 | 77 | 116 |

A-40: [C6H5-CH2OC(=O)-O-C6H4-S+(CH3)2] CH3SO4−

A-41: CH3C(=O)-O-C6H4-S+(CH3)2 CH3SO4−

A-42: CH3-(CH2)12-C(=O)-O-C6H4-S+(CH3)2 CH3SO4−

A-43: [fluorenyl-CH2OC(=O)-O-C6H4-S+(CH3)2] CH3SO4−

A-44: (CH3)3C-O-C(=O)-O-C6H4-S+(CH3)2 CH3SO4−

A-45: CH3O-C6H4-CH2O-C(=O)-O-C6H4-S+(CH3)2 CH3SO4−

A-46: [2,6-di-tert-butyl-4-(dimethylsulfonio)phenol] CH3SO4−

Examples 70 and 71, Comparative Examples 16 and 17

According to the conditions described in Table 15, compositions were prepared by incorporating bisphenol A type epoxy resin (ex Yuka-Shell Epoxy, Epikote 828), a cationic polymerization catalyst and a stabilizer, and then stored at 30° C. in the dark. The compositions after storage or immediately after preparation were subjected to the measurement of gelation time at 100° C. using a Yasuda-Seiki gel time tester Model 153. In addition, The state of the samples after storage was observed and classified into: ○, less increase of viscosity; Δ, increase of viscosity while the sample has a flowing property; and x, gelation. The results are shown in Table 15.

TABLE 15

| | Examples | | Comparative examples | |
|---|---|---|---|---|
| | 70 | 71 | 16 | 17 |
| Epikote 828 | 100 | 100 | 100 | 100 |
| Cationic polymerization catalyst | | | | |
| HO—⟨C₆H₄⟩—S⁺(CH₃)(CH₂—C₆H₄—CH₃) SbF₆⁻ | 1.5 | | 1.5 | |
| HO—⟨C₆H₄⟩—S⁺(CH₃)(CH₂—naphthyl) SbF₆⁻ | | 1.5 | | 1.5 |
| Stabilizer | | | 0.045 | 0.045 |
| HO—⟨C₆H₄⟩—S⁺(CH₃)₂ CH₃SO₄⁻ | | | | |
| Gelation time | | | | |
| Immediately after preparation | 14′38″ | 2′37″ | 2′6″ | 1′10″ |
| After 15 days | 16′20″ | 3′1″ | | |
| After 30 days | 18′23″ | 4′5″ | | |
| State after storage | | | | |
| Immediately after preparation | ○ | ○ | ○ | ○ |
| After 15 days | ○ | ○ | X | X |
| After 30 days | ○ | ○ | X | X |

As evidenced from the results estimated in Examples 1–71 and Comparative examples 1–17, the cationically polymerizable organic material compositions according to the present invention have a long pot life and thus the method for stabilizing the compositions is excellent.

ADVANTAGES OF THE INVENTION

As stated above, the cationically polymerizable organic material compositions incorporated a given stabilizer(s) according to the present invention have excellent storage stability at room temperature or at room temperature in the dark, and impart a long pot life. Moreover, said compositions are capable of being polymerized or cured within a short time by irradiation of for instance light or electron beam or by heat-treatment. Accordingly the compositions of the present invention can achieve the expected objects.

What is claimed is:

1. A method for stabilizing a composition comprising a cationic polymerization catalyst(s) and a cationically polymerizable organic material(s) as essential ingredients, which comprises incorporating in said composition, as a stabilizer, one or more onium salts having a counteranion selected from the group consisting of halogen, perchlorate, alkyl sulfate and p-toluenesulfonate ions, or one or more iron aromatic compound salts represented by the formula (I):

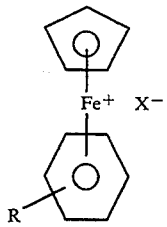

(I)

wherein R is hydrogen, halogen, or a $C_1$–$C_4$ alkyl group; and X is halogen, perchlorate, alkyl sulfate, or p-toluenesulfonate, said cationic polymerization catalyst(s) being selected from the group consisting of sulfonium salts and ammonium salts, having hexafluoroantimonate or hexafluorophosphate ion as a counteranion.

2. A method according to claim 1, wherein said stabilizer comprising one or more onium salts or said one or more iron aromatic compound salts are incorporated in an amount of from 0.01 to 20 parts by weight based on 100 parts by weight of the cationic polymerization catalyst.

3. A method according to claim 1, wherein the onium salt stabilizer is a sulfonium salt.

4. A method according to claim 3, wherein the sulfonium salt stabilizer is represented by the formula (II):

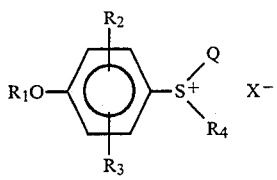

where $R_1$ is hydrogen, methyl group, acetyl group, methoxycarbonyl group, ethoxycarbonyl group, or benzyloxycarbonyl group; $R_2$ and $R_3$ are independently hydrogen, halogen, or a $C_1$–$C_4$ alkyl group; $R_4$ is a $C_1$–$C_4$ alkyl group; Q represents a $C_1$–$C_4$ alkyl group, benzyl group, methylbenzyl group, dimethylbenzyl group, trimethylbenzyl group, chlorobenzyl group, dichlorobenzyl group, trichlorobenzyl group, nitrobenzyl group, dinitrobenzyl group, trinitrobenzyl group, or naphthylmethyl group; and X is halogen, perchlorate, alkyl sulfate, or p-toluenesulfonate.

5. A method according to claim 4, wherein Q is a substituted or unsubstituted benzyl group.

6. A method according to claim 5, wherein the sulfonium salt is p-nitrobenzyl-4-hydroxyphenylmethylsulfonium chloride.

7. A method according to claim 4, wherein the sulfonium salt is p-hydroxyphenyldimethylsulfonium methyl sulfate.

8. A method according to claim 3, wherein the sulfonium salt is triphenylsulfonium chloride.

9. A method according to claim 1, wherein the onium salt stabilizer is an ammonium salt.

10. A method according to claim 1, wherein the onium salt stabilizer is a phosphonium salt.

11. A method according to claim 1, wherein the cationically polymerizable organic material is an epoxy compound.

12. A method according to claim 1, wherein the cationically polymerizable organic material is a cationically polymerizable vinyl compound.

13. A method according to claim 1, wherein the cationically polymerizable organic material is a cyclic organic ether.

14. A method for stabilizing a composition comprising a cationic polymerization catalyst(s) and a cationically polymerizable organic material(s) as essential ingredients, which comprises incorporating in said composition, as a stabilizer, one or more onium salts having a counteranion selected from the group consisting of halogen, perchlorate, alkyl sulfate and p-toluenesulfonate ions, or one or more iron aromatic compound salts represented by the formula (I):

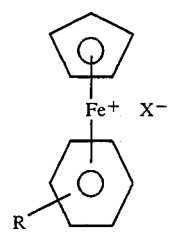

wherein R is hydrogen, halogen, or a $C_1$–$C_4$ alkyl group; and X is halogen, perchlorate, alkyl sulfate, or p-toluenesulfonate, said cationic polymerization catalyst(s) being selected from the group consisting of p-methoxybenzyltetramethylenesulfonium hexafluoroantimonate, p-methoxybenzyltetramethylenesulfonium hexafluorophosphate, benzyl-4-hydroxyphenylmethylsulfonium hexafluoroantimonate, p-nitrobenzyl-4-hydroxyphenylmethylsulfonium hexafluoroantimonate, p-nitrobenzyl-4-hydroxyphenylmethylsulfonium hexafluorophosphate, o-nitrobenzyl-4-hydroxyphenylmethylsulfonium hexafluorophosphate, α-naphthylmethyl-4-hydroxyphenylmethylsulfonium hexafluorophosphate, p-methyloxybenzyl-o-cyanopyridiniumhexafluoroantimonate, m-nitrobenzyl-4-hydroxyphenylmethylsulfonium hexafluoroantimonate, p-methoxybenzyldimethylphenylammonium hexafluoroantimonate, and cyclopentadienecumene-iron complex hexafluorophosphate.

* * * * *